US012789564B2

(12) United States Patent
Abe et al.

(10) Patent No.: US 12,789,564 B2
(45) Date of Patent: Nov. 10, 2026

(54) REAR SUSPENSION DEVICE

(71) Applicant: Nissan Motor Co., Ltd., Yokohama (JP)

(72) Inventors: Manabu Abe, Kanagawa (JP); Masatoshi Mori, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 19/148,372

(22) PCT Filed: Jan. 24, 2023

(86) PCT No.: PCT/JP2023/002021
§ 371 (c)(1),
(2) Date: Jul. 16, 2025

(87) PCT Pub. No.: WO2024/157340
PCT Pub. Date: Aug. 2, 2024

(65) Prior Publication Data
US 2026/0217073 A1 Jul. 30, 2026

(51) Int. Cl.
*B60G 3/20* (2006.01)
*B60G 7/00* (2006.01)
*B60G 15/02* (2006.01)

(52) U.S. Cl.
CPC ............. *B60G 3/202* (2013.01); *B60G 7/001* (2013.01); *B60G 7/008* (2013.01); *B60G 15/02* (2013.01);
(Continued)

(58) Field of Classification Search
CPC ........ B60G 3/202; B60G 7/001; B60G 7/008; B60G 15/02; B60G 2204/148; B60G 2204/41
See application file for complete search history.

(56) References Cited

U.S. PATENT DOCUMENTS

| | | | | |
|---|---|---|---|---|
| 5,415,427 | A | 5/1995 | Sommerer et al. | |
| 2009/0160154 | A1 | 6/2009 | Frasch et al. | |
| 2015/0232126 | A1* | 8/2015 | Okuyama ............. | B62D 21/11 280/781 |

FOREIGN PATENT DOCUMENTS

| | | | |
|---|---|---|---|
| JP | H01119404 | A * | 5/1989 |
| JP | H4-90910 | A | 3/1992 |

(Continued)

OTHER PUBLICATIONS

JPH01119404A Machine English Translation (Year: 1989).*

*Primary Examiner* — Jason D Shanske
*Assistant Examiner* — Matthew James O'Neill
(74) *Attorney, Agent, or Firm* — Spencer Fane LLP

(57) ABSTRACT

A rear suspension device links a wheel and a vehicle body by a first upper link, a second upper link, a first lower link, a second lower link and a third lower link. The rigidity of the first upper link and the rigidity of the second upper link are different. The rigidity of the second upper link that has a relatively large inclination angle with respect to the vehicle width direction in a plan view of the vehicle is lower than the rigidity of the first upper link that has a relatively small inclination angle with respect to the vehicle width direction in the plan view of the vehicle. When inclination angles of the upper links with respect to the vehicle width direction are equivalent, the rigidity of the second upper link that has a relatively long distance from a wheel axle in a plan view of the vehicle is lower than the rigidity of the first upper link that has a relatively short distance from the wheel axle in the plan view of the vehicle.

15 Claims, 16 Drawing Sheets

(52) U.S. Cl.
CPC .... *B60G 2204/148* (2013.01); *B60G 2204/41* (2013.01)

(56) References Cited

FOREIGN PATENT DOCUMENTS

| | | | |
|---|---|---|---|
| JP | H6-64427 | A | 3/1994 |
| JP | H6-508080 | A | 9/1994 |
| JP | 4195208 | B2 | 12/2008 |
| JP | 2009-90762 | A | 4/2009 |
| JP | 2009-149296 | A | 7/2009 |
| JP | 2015-155252 | A | 8/2015 |

* cited by examiner

REAR SUSPENSION DEVICE

CROSS-REFERENCE TO RELATED APPLICATIONS

This application is a U.S. national stage application of International Application No. PCT/JP2023/002021, filed on Jan. 24, 2023.

BACKGROUND

Technical Field

The present invention relates to a rear suspension device for an automobile.

Background Information

A conventionally known multi-link rear suspension device includes an A-type upper link and three lower links (Japanese Patent No. 4,195,208 B).

SUMMARY

It is considered desirable for a rear suspension device to be set with a high rigidity in the vehicle width direction to improve the turning response, while being set with a low rigidity in the front-rear direction of the vehicle to reduce the shock when going over a step. However, as in the above conventional technique, the A-type upper link has a problem in that it is difficult to set a low rigidity in the front-rear direction of the vehicle.

A problem to be solved by the present invention is to provide a rear suspension device that can be set with a high rigidity in the vehicle width direction, while being set with a low rigidity in the front-rear direction of the vehicle.

The present invention solves the above problem in a rear suspension device that links a wheel and a vehicle body by means of two upper links and two or more lower links through making the rigidity of the two upper links different.

Effect of Invention

According to the present invention, since the rigidity of the two upper links is different, the rigidity in the vehicle width direction can be set high while the rigidity in the front-rear direction of the vehicle can be set low.

Referring now to the attached drawings which form a part of this original disclosure, illustrative embodiments are shown.

DETAILED DESCRIPTION OF EMBODIMENTS

Hereinafter, embodiments of the present invention will be described with reference to the drawings. The rear suspension device according to the present invention is a so-called independent suspension device that can raise and lower the right and left wheels independently, and is also a so-called multi-link suspension device that includes multiple links. In the following embodiments, the present invention will be described using a rear suspension device suspended between the left rear wheel and the vehicle body as an example, but a rear suspension device suspended between the right rear wheel and the vehicle body can also be configured in the same way.

Figure 1:
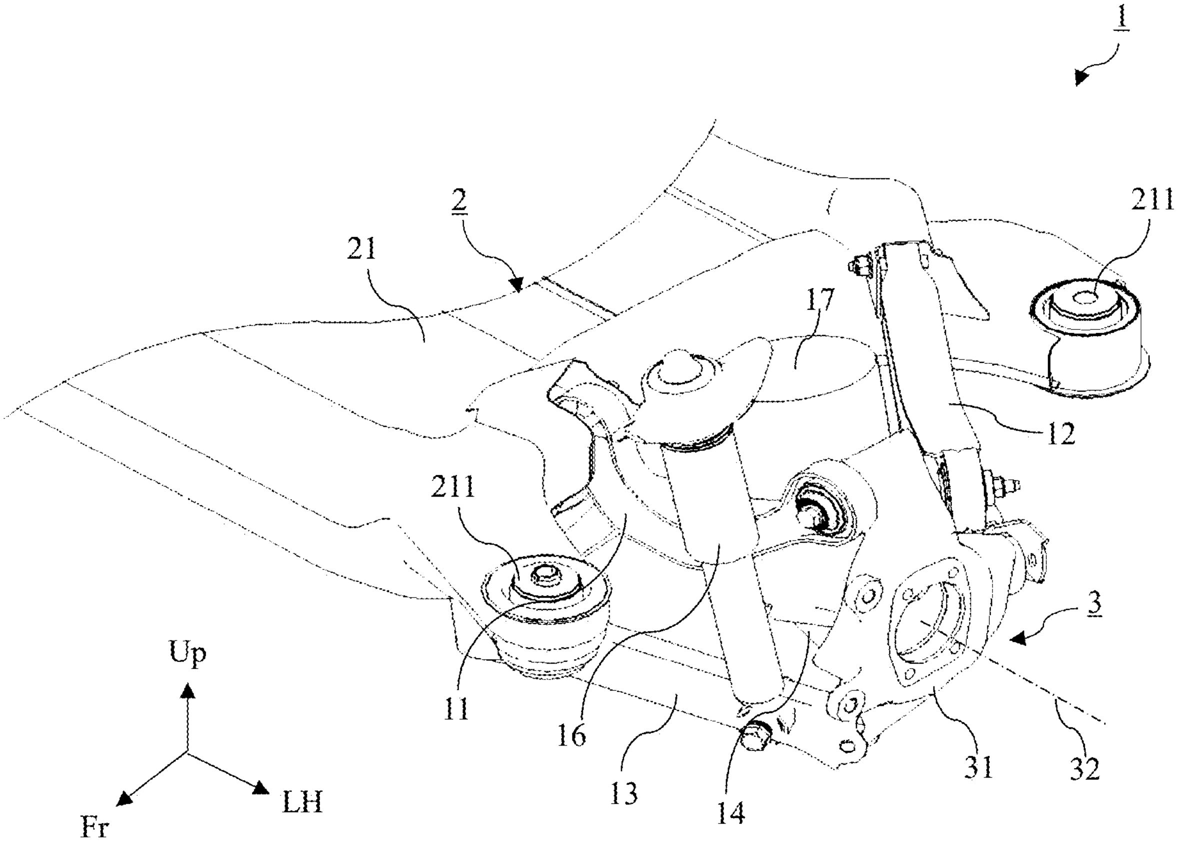
FIG. 1 is a perspective view illustrating a rear suspension device according to a first embodiment of the present invention.
Figure 2A:
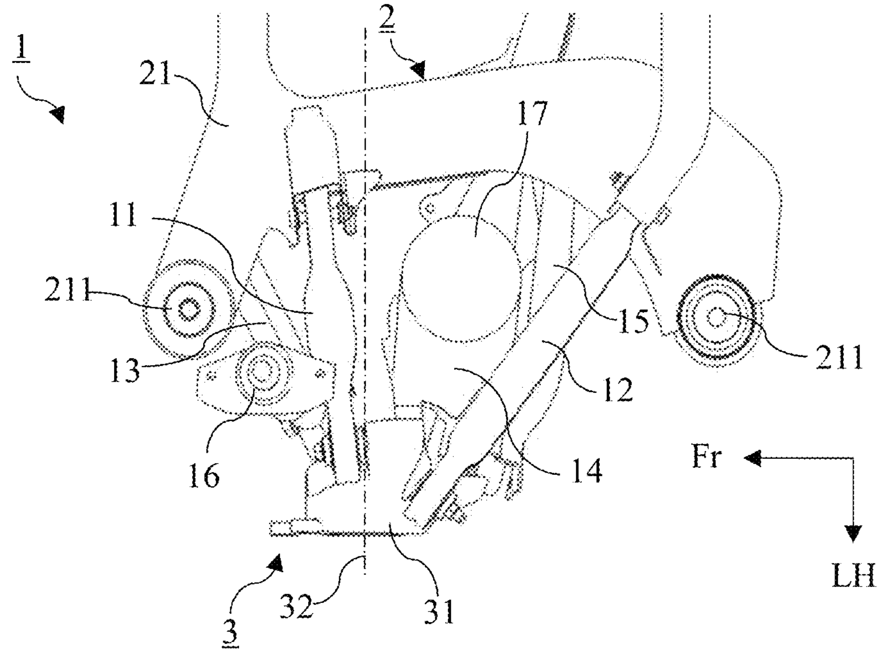
FIG. 2A is a plan view of the rear suspension device of FIG. 1 as seen from above the vehicle.
Figure 2B:
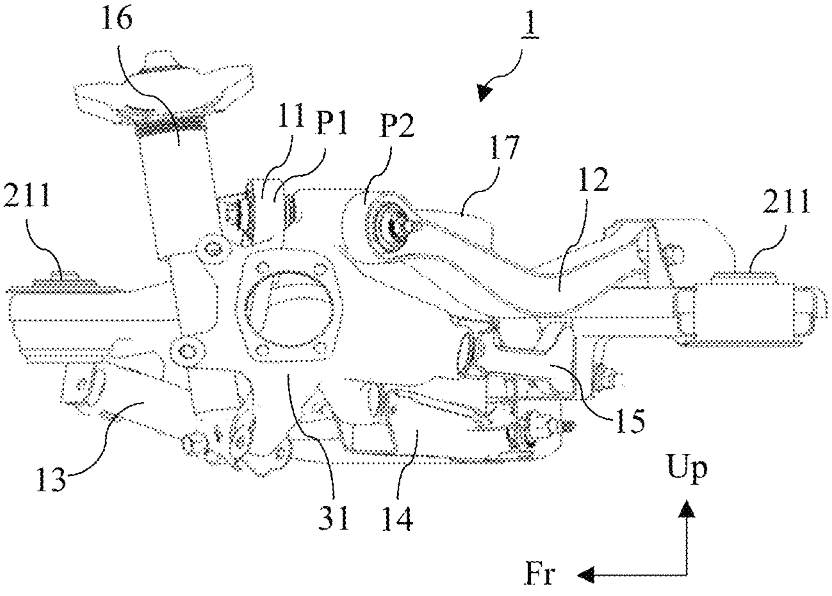
FIG. 2B is a side view of the rear suspension device of FIG. 1 as seen from the side of the vehicle.
Figure 2C:
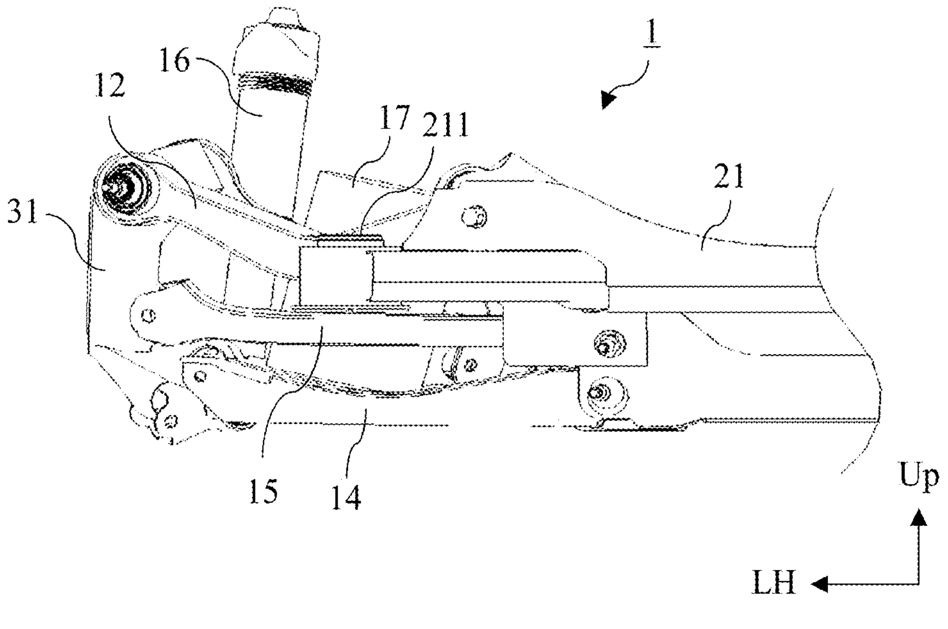
FIG. 2C is a rear view of the rear suspension device of FIG. 1 as seen from the rear of the vehicle.

FIG. 1 is a perspective view illustrating a rear suspension device 1 according to a first embodiment of the present invention, FIG. 2A is a plan view of the rear suspension device 1 of FIG. 1 as seen from above the vehicle, FIG. 2B is a side view of the rear suspension device 1 of FIG. 1 as seen from the side of the vehicle, and FIG. 2C is a rear view of the rear suspension device 1 of FIG. 1 as seen from the rear of the vehicle. Although the tire and wheel are not illustrated in FIGS. 1 and 2A to 2C, these tire and wheel are rotatably provided on a knuckle 31, which will be described later, and in the case of a rear-wheel drive vehicle, are connected to a drive shaft (not illustrated, only a wheel axle 32 is illustrated).

The rear suspension device 1 of the present embodiment is suspended between a vehicle body 2 and a wheel 3 and includes two upper links and three lower links. Of the two upper links, the one on the front side of the vehicle is referred to as a first upper link 11, and the one on the rear side of the vehicle is referred to as a second upper link 12. Of the three lower links, the one on the frontmost side in the front-rear direction of the vehicle is referred to as a first lower link 13, the one in the center in the front-rear direction of the vehicle is referred to as a second lower link 14, and the one on the rearmost side in the front-rear direction of the vehicle is referred to as a third lower link 15. The lower links of the present invention are not limited to three lower links, and may be configured with two lower links or four or more lower links.

Although not particularly limited, these first upper link 11, second upper link 12, first lower link 13, second lower link 14, and third lower link 15 are rigid bodies composed of processed steel plates, cast products, forged products, or the like. Rubber bushings (details not illustrated) are provided at both end portions of the first upper link 11, second upper link 12, first lower link 13, second lower link 14, and third lower link 15, one ends of which are swingably attached to brackets provided on the vehicle body 2, and the other ends of which are swingably attached to the knuckle 31 of the wheel 3.

Examples of the vehicle body 2 to which one ends of these first upper link 11, second upper link 12, first lower link 13, second lower link 14, and third lower link 15 are attached include rear side members as well as a rear suspension member 21 fixed to the rear floor via rubber bushings 211. In the illustrated embodiment, one ends of the first upper link 11, second upper link 12, first lower link 13, second lower link 14, and third lower link 15 are swingably attached to the rear suspension member 21, but some or all of them may be swingably attached to the rear side members, etc.

The rear suspension device 1 of the present embodiment includes, in order from the front side of the vehicle, the first lower link 13, the second lower link 14, and the third lower link 15. Of these, the end portions of the first lower link 13 and second lower link 14 on the wheel 3 side are swingably attached to the lower portion of the knuckle 31 via rubber bushings, and the end portions on the vehicle body 2 side are swingably attached to the lower portion of the rear suspension member 21 via rubber bushings. In contrast, the end portion of the third lower link 15 on the wheel 3 side is swingably attached to the central portion of the knuckle 31 via a rubber bushing as illustrated in FIG. 2C, and the end portion on the vehicle body 2 side is swingably attached to the central portion of the rear suspension member 21 via a rubber bushing.

The rear suspension device 1 of the present embodiment further includes a shock absorber 16 and a spring 17. The lower end portion of the shock absorber 16 of the present embodiment is swingably attached to the first lower link 13 as illustrated in FIGS. 1 and 2B, and the upper end portion is attached to the vehicle body 2 (not illustrated). The lower end portion of the spring 17 of the present embodiment is attached to the second lower link 14 as illustrated in FIGS. 2A and 2C, and the upper end portion is attached to the vehicle body 2 (not illustrated).

The rear suspension device 1 of the present embodiment includes the first upper link 11 and second upper link 12 as I-type upper links. The end portions of the first upper link 11 and second upper link 12 on the wheel 3 side are swingably attached to the upper portion of the knuckle 31 via rubber bushings, and the end portions on the vehicle body 2 side are swingably attached to the lower portion of the rear suspension member 21 via rubber bushings.

Figure 3A:
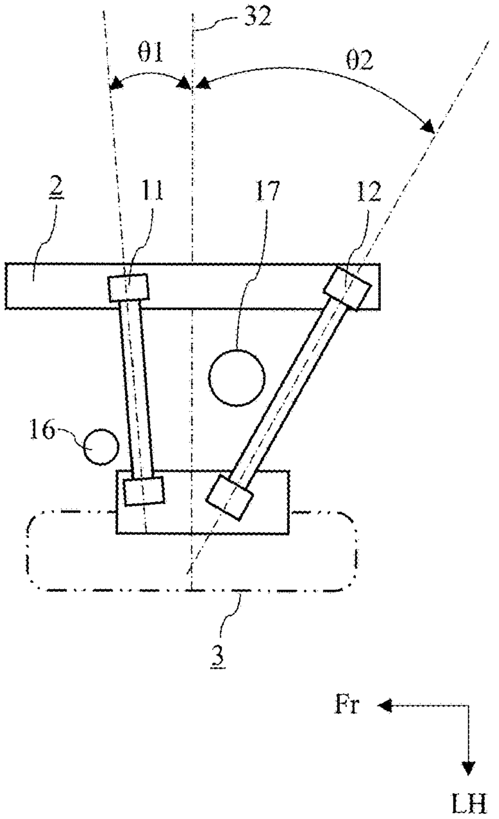
FIG. 3A is a plan view schematically illustrating upper links of the rear suspension device of FIG. 1.
Figure 3B:
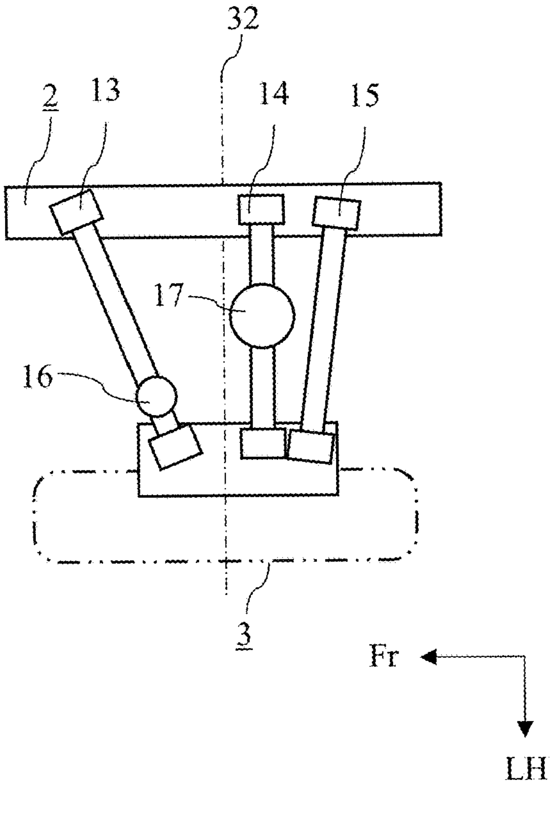
FIG. 3B is a plan view schematically illustrating lower links of the rear suspension device of FIG. 1.

FIG. 3A is a plan view schematically illustrating the first upper link 11 and second upper link 12 of the rear suspension device 1 of the present embodiment, and FIG. 3B is a plan view schematically illustrating the first lower link 13, second lower link 14, and third lower link 15 of the rear suspension device 1 of the present embodiment. In the rear suspension device 1 of the present embodiment, the hardness of the rubber bushings, for example, is set so that the rigidity of the first upper link 11 and the rigidity of the second upper link 12 are different values. By making the rigidity of the first upper link 11 and second upper link 12 different, the rigidity in the vehicle width direction can be set high, while the rigidity in the front-rear direction of the vehicle can be set low.

That is, the hardness of the rubber bushings is set so that the rigidity of one upper link is higher or lower than the rigidity of the other upper link. Increasing the hardness of the rubber bushings increases the rigidity of the rubber bushings, making it possible to increase the rigidity of the upper links. Conversely, decreasing the hardness of the rubber bushings decreases the rigidity of the rubber bushings, making it possible to decrease the rigidity of the upper links. The means for making the rigidity of one upper link different from the rigidity of the other upper link is not limited to setting the rigidity of the rubber bushings, and the rigidity of an upper link main body may be made different by changing the shape or material of the upper links, etc. The rigidity of an upper link refers to the degree of resistance to deformation in response to the force input to the upper link, and when the deformation in response to the input is small, the rigidity is said to be high, while when the deformation is large, the rigidity is said to be low.

In particular, in the rear suspension device 1 of the present embodiment, when the rigidity of the first upper link 11 and the rigidity of the second upper link 12 are made different, the rigidity of the upper link of these two first upper link 11 and second upper link 12 that has a relatively large inclination angle θ with respect to the vehicle width direction in a plan view of the vehicle is set lower than the rigidity of the upper link that has a relatively small inclination angle θ with respect to the vehicle width direction in the plan view of the vehicle. In other words, as illustrated in the plan view of FIG. 3A, when the angle between the wheel axle 32 parallel to the vehicle width direction and the extension direction of the first upper link 11 is an inclination angle θ1 and the angle between the wheel axle 32 parallel to the vehicle width direction and the extension direction of the second upper link 12 is an inclination angle θ2, θ1<θ2 is satisfied in the rear suspension device 1 of the illustrated embodiment. Accordingly, the rigidity of the rubber bushings of the second upper link 12 is set low while the rigidity of the rubber bushings of the first upper link 11 is set high so that the rigidity of the second upper link 12 is lower than that of the first upper link 11.

By setting relatively low the rigidity of the second upper link 12 which has a large inclination angle θ2 with respect to the vehicle width direction, the rigidity in the vehicle width direction can be set relatively high, and the turning response can be improved. In addition, by setting relatively high the rigidity of the first upper link 11 which has a small inclination angle θ1 with respect to the vehicle width direction, the rigidity in the front-rear direction of the vehicle can be relatively reduced, and the impact when going over a step can be reduced.

Figure 3C:
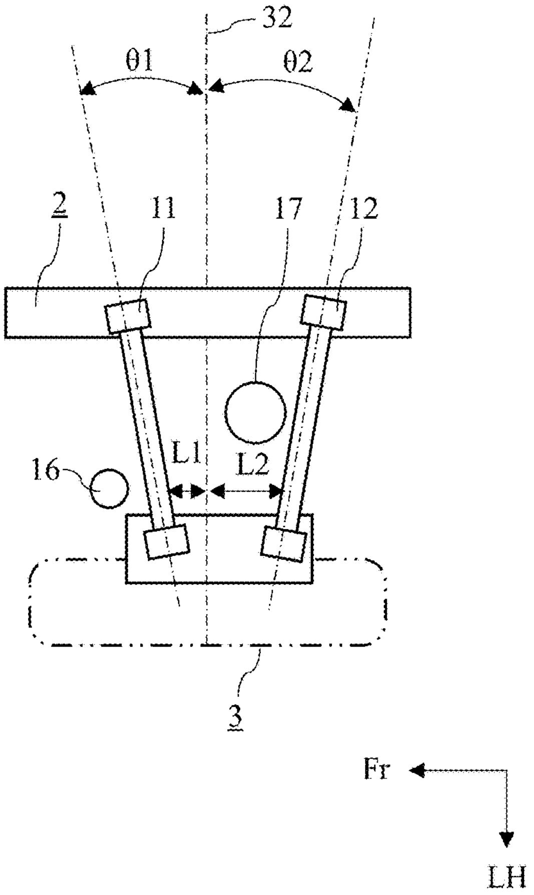
FIG. 3C is a plan view illustrating upper links according to another example of the rear suspension device of FIG. 1.

When the inclination angle θ1 of the first upper link 11 and the inclination angle θ2 of the second upper link 12 are equivalent (the absolute value of the difference between θ1 and θ2 is, for example, 5° or less) in a plan view of the vehicle, the rigidity may be made different depending on a distance L between the first upper link 11 and second upper link 12 and the wheel axle 32. FIG. 3C is a plan view schematically illustrating upper links according to another example of the rear suspension device 1 of the present embodiment. In the figure, it is assumed that the absolute value of the difference between the inclination angle θ1 of the first upper link 11 and the inclination angle θ2 of the second upper link 12 is 5° or less and can be said to be equivalent. In this case, the distance L1 between the wheel axle 32 and the first upper link 11 is compared with the distance L2 between the wheel axle 32 and the second upper link 12, and the rigidity of the upper link with a relatively long distance to the wheel axle 32 is made lower than the rigidity of the upper link with a relatively short distance to the wheel axle. In the example illustrated in the figure, since L1<L2 is satisfied, the rigidity of the rubber bushings of the second upper link 12 may be set low while the rigidity of the rubber bushings of the first upper link 11 may be set high so that the rigidity of the second upper link 12 is lower than that of the first upper link 11. The distance L between the upper link and the wheel axle 32 may be compared by comparing the distance on the same straight line in the front-rear direction of the vehicle, or by comparing the shortest distance.

By setting relatively low the rigidity of the second upper link 12 which is at a long distance from the wheel axle 32, the rigidity in the vehicle width direction can be set relatively high, and the turning response can be improved. In addition, by setting relatively high the rigidity of the first upper link 11 which is at a short distance from the wheel axle 32, the rigidity in the front-rear direction of the vehicle can be relatively reduced, and the impact when going over a step can be reduced.

Figure 3D:
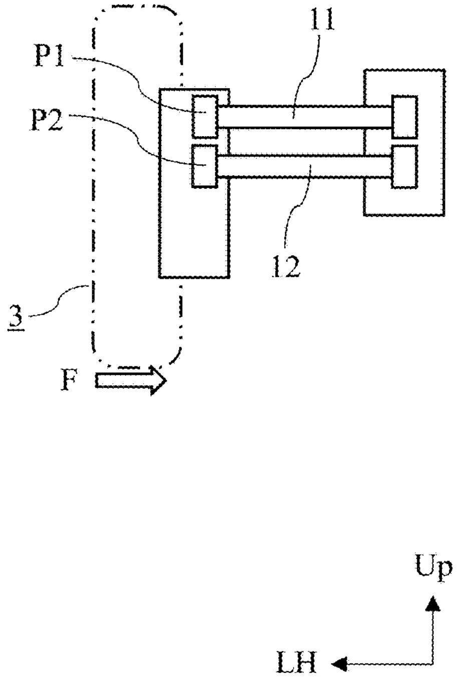
FIG. 3D is a rear view of FIG. 3A.

In the rear suspension device 1 of the present embodiment, as illustrated in FIG. 2B, an attachment position P1 of the first upper link 11 whose rigidity is relatively high on the wheel 3 side in a vehicle side view (or a vehicle front view or a vehicle rear view) is set at a higher position than an attachment position P2 of the second upper link 12 whose rigidity is relatively low on the wheel 3 side in a vehicle side view (or a vehicle front view or a vehicle rear view). FIG. 3D is a rear view of FIG. 3A, and is a diagram illustrating the relationship between the attachment positions P1 and P2 of the first upper link 11 and second upper link 12 on the wheel 3 side in an easy-to-understand manner. As illustrated in the figure, when a force F in the direction of the arrow acts on the lower portion of the wheel 3, a force is generated that causes the upper portion of the wheel 3 to fall outward. At this time, it is preferred that the attachment position of the upper link on the wheel 3 side should be high, but in the rear suspension device 1 of the present embodiment, this role is played by the first upper link 11 whose rigidity is relatively high, and it is therefore possible to efficiently ensure the camber rigidity, that is, high lateral rigidity.

In other words, in the layout of the rear suspension device 1, there is a certain upper limit to the height of the attachment position of the upper link on the wheel 3 side. In the rear suspension device 1 of the present embodiment, the attachment position P1 of the first upper link 11 whose rigidity is relatively high on the wheel 3 side is set at a higher position than the attachment position P2 of the second upper link 12 whose rigidity is relatively low on the wheel 3 side, and therefore higher lateral rigidity can be ensured compared to the opposite case, that is, the case in which the attachment position P2 of the second upper link 12 whose rigidity is relatively low on the wheel 3 side is set at a higher position than the attachment position P1 of the first upper link 11 whose rigidity is relatively high on the wheel 3 side.

In the rear suspension device 1 of the present embodiment, as illustrated in the plan view of FIG. 3A, the shock absorber 16 installed between the vehicle body 2 and the first lower link 13, the first upper link 11 whose rigidity is relatively high, the wheel axle 32 (drive shaft in the case of a rear-wheel drive vehicle), the spring 17 installed between the vehicle body 2 and the second lower link 14, and the second upper link 12 whose rigidity is relatively low are arranged in this order from the front in the front-rear direction of the vehicle in a plan view of the vehicle.

In general, the center of rotation of the rear suspension device 1 is set in front of the wheel 3 to suppress changes in the posture during braking. As in the rear suspension device 1 of the present embodiment, by supporting the shock absorber 16 on the first lower link 13 which is the most forward of the vehicle, the stroke of the shock absorber 16 relative to the stroke of the wheel 3 can be made small. As a result, the height of the upper end portion of the shock absorber 16 can be set low, and the volume of the luggage compartment behind the cabin can be increased for application to a station wagon or the like.

In addition, by supporting the spring 17 on the second lower link 14 which is located rearward of the wheel axle 32, it is possible to ensure the stroke amount of the spring 17. By locating the spring 17 rearward of the wheel axle 32, the second upper link 12 which has a large inclination angle θ2 and a relatively low rigidity can be disposed rearward of the spring 17, while the first upper link 11 which has a small inclination angle θ1 and a relatively high rigidity can be disposed in front of the wheel axle 32.

Figure 4:
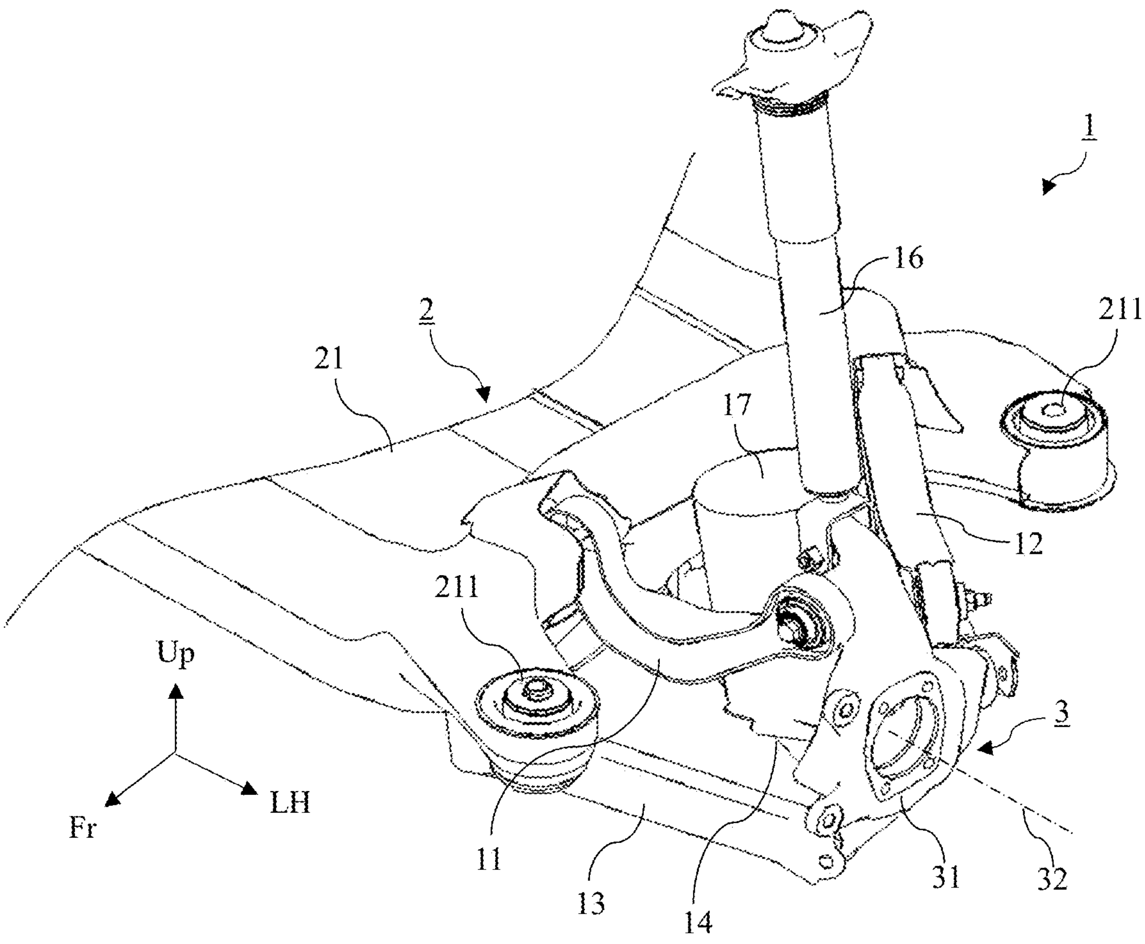
FIG. 4 is a perspective view illustrating the rear suspension device according to a second embodiment of the present invention.
Figure 5A:
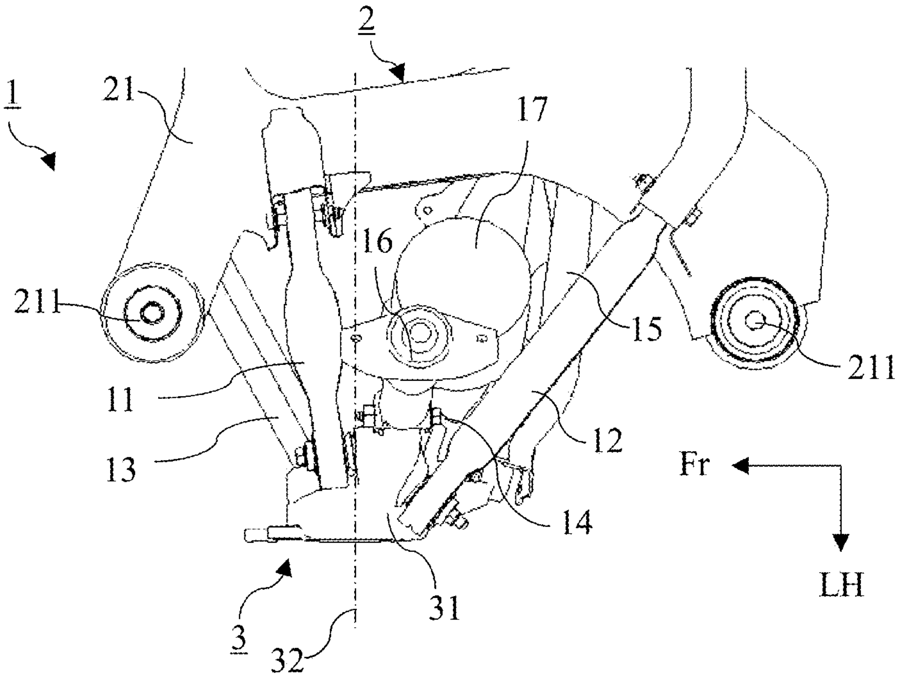
FIG. 5A is a plan view of the rear suspension device of FIG. 4 as seen from above the vehicle.
Figure 5B:
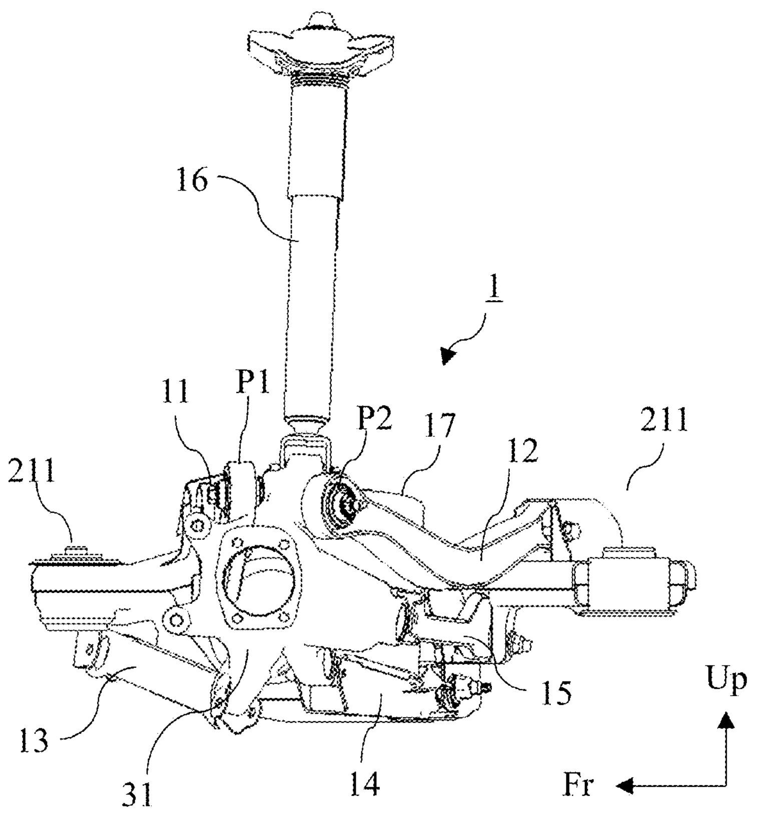
FIG. 5B is a side view of the rear suspension device of FIG. 4 as seen from the side of the vehicle.
Figure 5C:
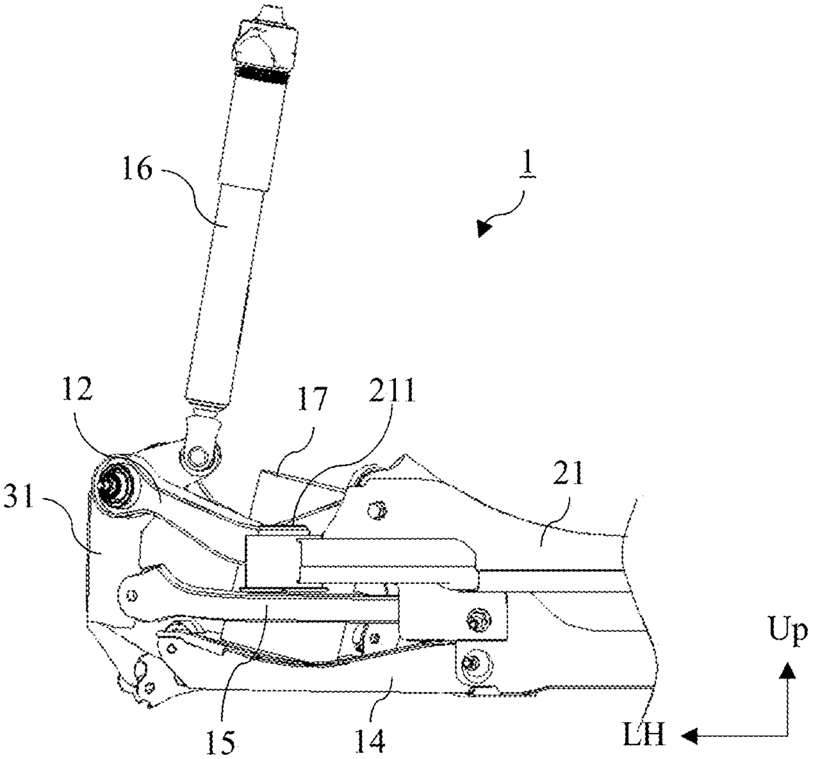
FIG. 5C is a rear view of the rear suspension device of FIG. 4 as seen from the rear of the vehicle.

FIG. 4 is a perspective view illustrating a rear suspension device 1 according to a second embodiment of the present invention, FIG. 5A is a plan view of the rear suspension device 1 of FIG. 4 as seen from above the vehicle, FIG. 5B is a side view of the rear suspension device 1 of FIG. 4 as seen from the side of the vehicle, and FIG. 5C is a rear view of the rear suspension device 1 of FIG. 4 as seen from the rear of the vehicle.

The rear suspension device 1 of the present embodiment is suspended between a vehicle body 2 and a wheel 3 and includes two upper links and three lower links. Of the two upper links, the one on the front side of the vehicle is referred to as a first upper link 11, and the one on the rear side of the vehicle is referred to as a second upper link 12. Of the three lower links, the one on the frontmost side in the front-rear direction of the vehicle is referred to as a first lower link 13, the one in the center in the front-rear direction of the vehicle is referred to as a second lower link 14, and the one on the rearmost side in the front-rear direction of the vehicle is referred to as a third lower link 15. Of the first lower link 13, the second lower link 14, and the third lower link 15, the end portions of the first lower link 13 and second lower link 14 on the wheel 3 side are swingably attached to the lower portion of the knuckle 31 via rubber bushings, and the end portions on the vehicle body 2 side are swingably attached to the lower portion of the rear suspension member 21 via rubber bushings. In contrast, the end portion of the third lower link 15 on the wheel 3 side is swingably attached to the central portion of the knuckle 31 via a rubber bushing as illustrated in FIG. 5C, and the end portion on the vehicle body 2 side is swingably attached to the central portion of the rear suspension member 21 via a rubber bushing.

The rear suspension device 1 of the present embodiment further includes a shock absorber 16 and a spring 17. The rear suspension device 1 of the present embodiment is different from the rear suspension device 1 of the above-described first embodiment in the attachment position of the shock absorber 16. That is, the lower end portion of the shock absorber 16 of the present embodiment is swingably attached to the upper portion of the knuckle 31 as illustrated in FIGS. 4, 5B, and 5C, and the upper end portion is attached to the vehicle body 2 (not illustrated). The lower end portion of the spring 17 of the present embodiment is attached to the second lower link 14 as illustrated in FIGS. 5A and 5C, and the upper end portion is attached to the vehicle body 2 (not illustrated).

The rear suspension device 1 of the present embodiment is different from the rear suspension device 1 of the above-described first embodiment in the attachment position of the shock absorber 16, and has the same configuration as the rear suspension device 1 of the above-described first embodiment, including the configurations of the first upper link 11 and second upper link 12. Accordingly, the same reference numerals as those in FIGS. 1 to 2C are used in FIGS. 4 to 5C, and the explanation given in the first embodiment with reference to FIGS. 1 to 2C is borrowed herein.

Figure 6A:
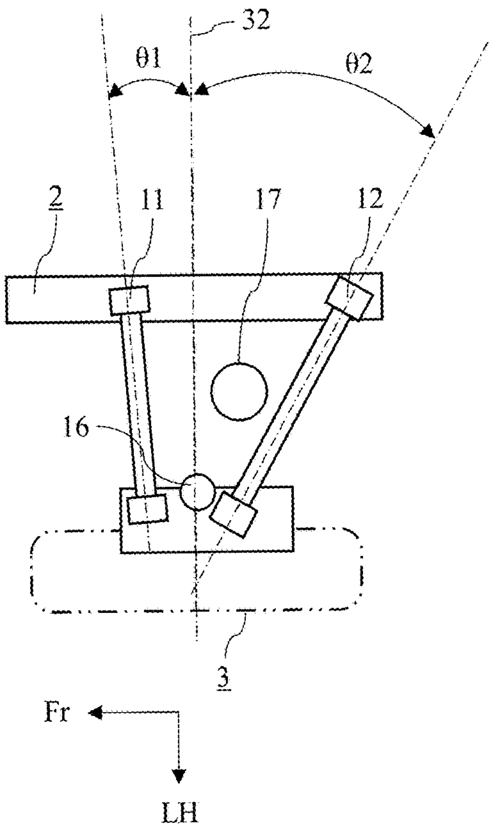
FIG. 6A is a plan view schematically illustrating upper links of the rear suspension device of FIG. 4.
Figure 6B:
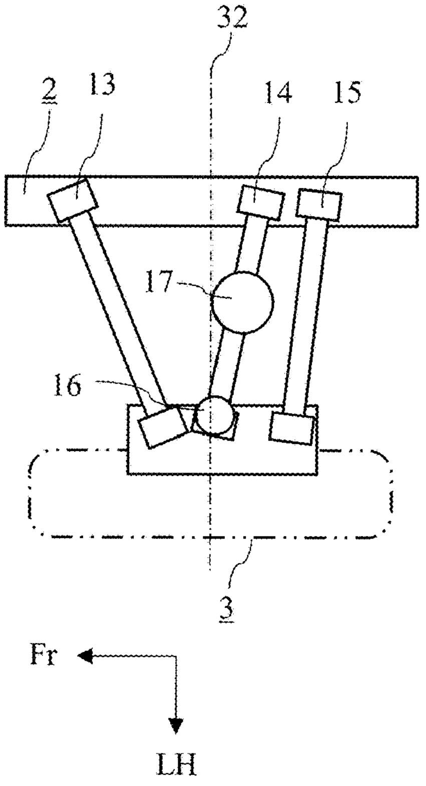
FIG. 6B is a plan view schematically illustrating lower links of the rear suspension device of FIG. 4.

FIG. 6A is a plan view schematically illustrating the first upper link 11 and second upper link 12 of the rear suspension device 1 of the present embodiment, and FIG. 6B is a plan view schematically illustrating the first lower link 13, second lower link 14, and third lower link 15 of the rear suspension device 1 of the present embodiment.

In the rear suspension device 1 of the present embodiment, as illustrated in the plan view of FIG. 6A, the first upper link 11 whose rigidity is relatively high, the shock absorber 16 installed between the wheel axle 32 (drive shaft in the case of a rear-wheel drive vehicle) and vehicle body 2 and the knuckle 31, the spring 17 installed between the vehicle body 2 and the second lower link 14, and the second upper link 12 whose rigidity is relatively low are arranged in this order from the front in the front-rear direction of the vehicle in a plan view of the vehicle.

By disposing the shock absorber 16 above the wheel axle 32 (or the drive shaft in the case of a rear-wheel drive vehicle) as in the rear suspension device 1 of the present embodiment, the offset between the shock absorber 16 and the wheel axle 32 is reduced, and it is possible to suppress a decrease in the cushioning effect of the shock absorber 16 caused by the deflection when the rear suspension device 1 strokes. In addition, when the upper end portion of the shock absorber 16 is set at a high position on the vehicle body 2, the stroke amount of the shock absorber 16 is increased. As a result, it is possible to improve the ride comfort performance so as to be applied to a sedan or the like.

Figure 7:
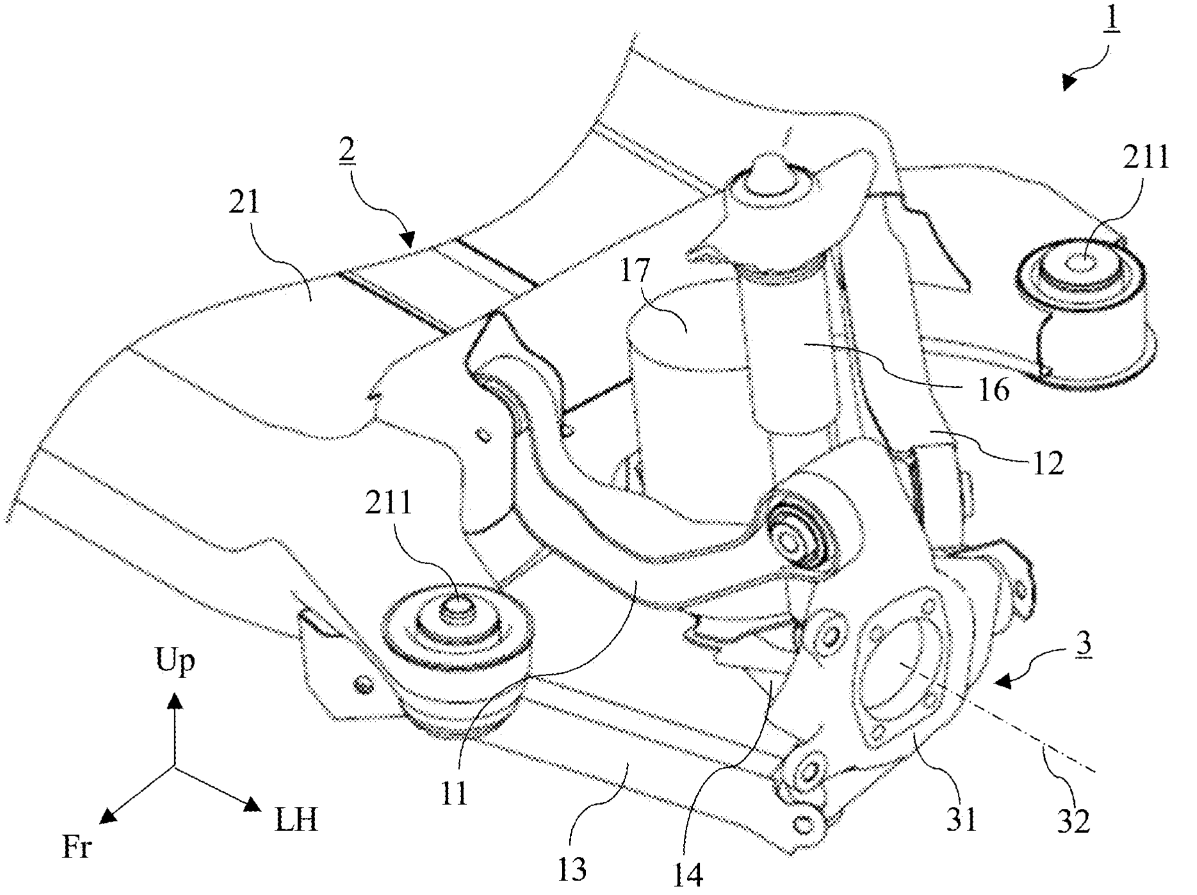
FIG. 7 is a perspective view illustrating the rear suspension device according to a third embodiment of the present invention.
Figure 8A:
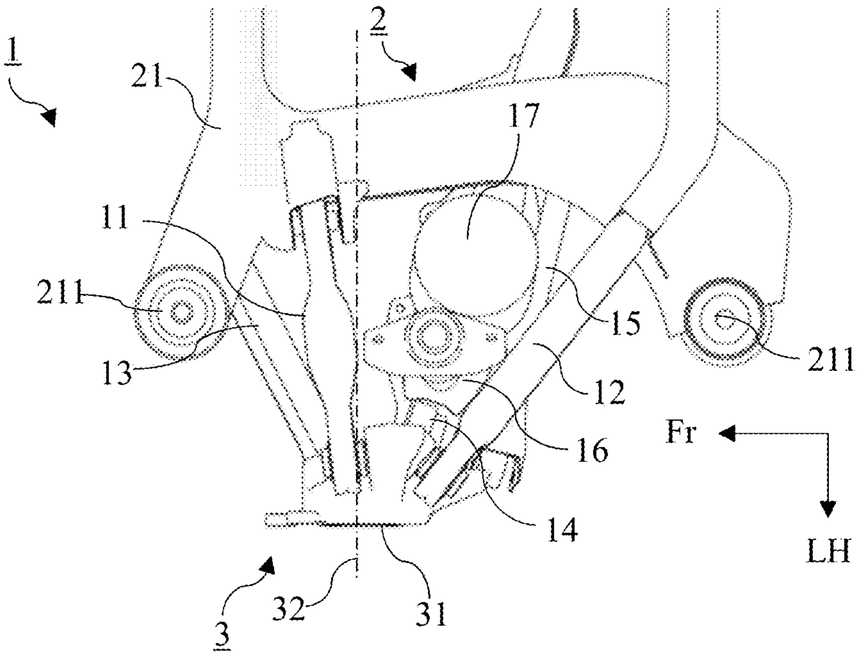
FIG. 8A is a plan view of the rear suspension device of FIG. 7 as seen from above the vehicle.
Figure 8B:
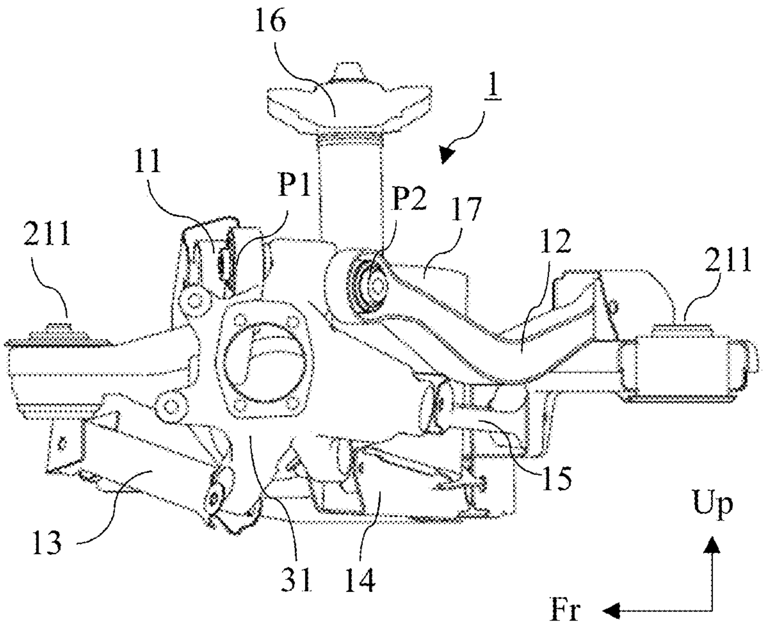
FIG. 8B is a side view of the rear suspension device of FIG. 7 as seen from the side of the vehicle.
Figure 8C:
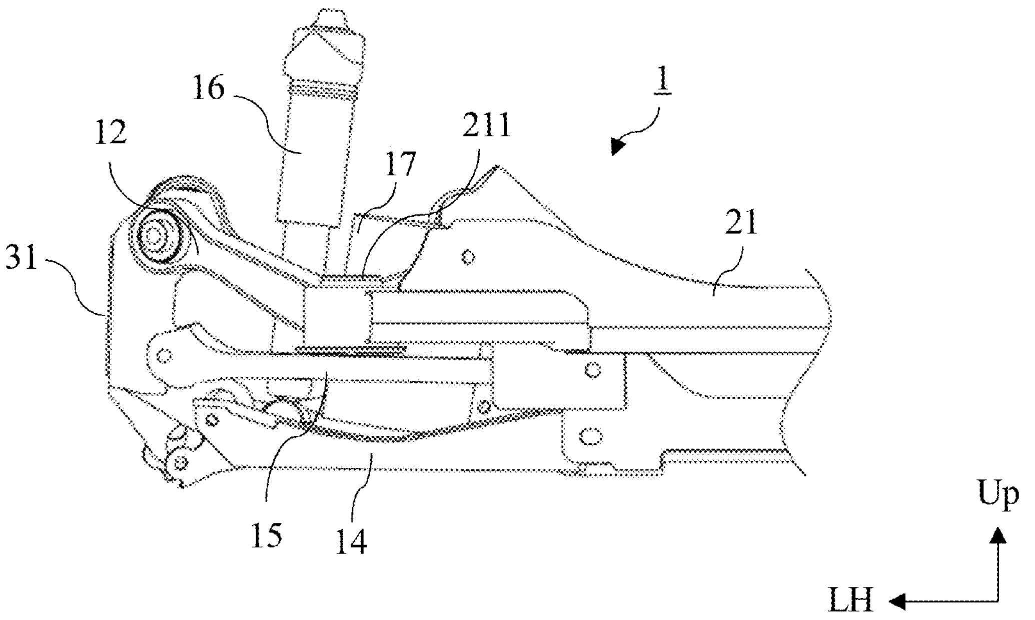
FIG. 8C is a rear view of the rear suspension device of FIG. 7 as seen from the rear of the vehicle.

FIG. 7 is a perspective view illustrating a rear suspension device 1 according to a third embodiment of the present invention, FIG. 8A is a plan view of the rear suspension device 1 of FIG. 7 as seen from above the vehicle, FIG. 8B is a side view of the rear suspension device 1 of FIG. 7 as seen from the side of the vehicle, and FIG. 8C is a rear view of the rear suspension device 1 of FIG. 7 as seen from the rear of the vehicle.

The rear suspension device 1 of the present embodiment is suspended between a vehicle body 2 and a wheel 3 and includes two upper links and three lower links. Of the two upper links, the one on the front side of the vehicle is referred to as a first upper link 11, and the one on the rear side of the vehicle is referred to as a second upper link 12. Of the three lower links, the one on the frontmost side in the front-rear direction of the vehicle is referred to as a first lower link 13, the one in the center in the front-rear direction of the vehicle is referred to as a second lower link 14, and the one on the rearmost side in the front-rear direction of the vehicle is referred to as a third lower link 15. Of the first lower link 13, the second lower link 14, and the third lower link 15, the end portions of the first lower link 13 and second lower link 14 on the wheel 3 side are swingably attached to the lower portion of the knuckle 31 via rubber bushings, and the end portions on the vehicle body 2 side are swingably attached to the lower portion of the rear suspension member 21 via rubber bushings. In contrast, the end portion of the third lower link 15 on the wheel 3 side is swingably attached to the central portion of the knuckle 31 via a rubber bushing as illustrated in FIG. 8C, and the end portion on the vehicle body 2 side is swingably attached to the central portion of the rear suspension member 21 via a rubber bushing.

The rear suspension device 1 of the present embodiment further includes a shock absorber 16 and a spring 17. The rear suspension device 1 of the present embodiment is different from the rear suspension device 1 of the above-described first embodiment in the attachment position of the shock absorber 16. That is, the lower end portion of the shock absorber 16 of the present embodiment is swingably attached to the second lower link 14 as illustrated in FIGS. 7, 8A, and 8C, and the upper end portion is attached to the vehicle body 2 (not illustrated). The lower end portion of the spring 17 of the present embodiment is attached to the second lower link 14 as illustrated in FIGS. 8A and 8C, and the upper end portion is attached to the vehicle body 2 (not illustrated).

The rear suspension device 1 of the present embodiment is different from the rear suspension device 1 of the above-described first embodiment in the attachment position of the shock absorber 16, and has the same configuration as the rear suspension device 1 of the above-described first embodiment, including the configurations of the first upper link 11 and second upper link 12. Accordingly, the same reference numerals as those in FIGS. 1 to 2C are used in FIGS. 7 to 8C, and the explanation given in the first embodiment with reference to FIGS. 1 to 2C is borrowed herein.

Figure 9A:
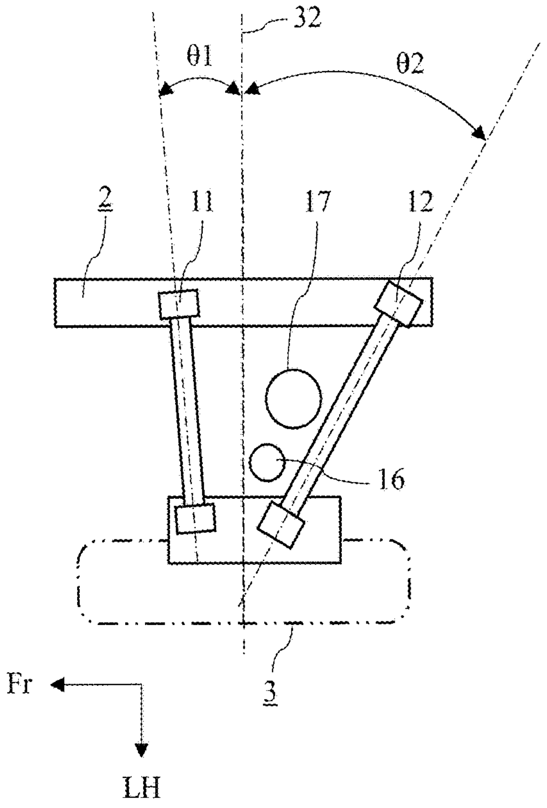
FIG. 9A is a plan view schematically illustrating upper links of the rear suspension device of FIG. 7.
Figure 9B:
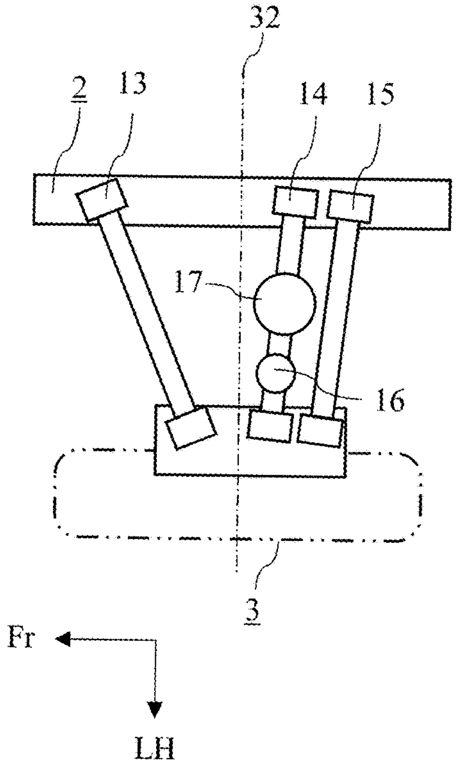
FIG. 9B is a plan view schematically illustrating lower links of the rear suspension device of FIG. 7.

FIG. 9A is a plan view schematically illustrating the first upper link 11 and second upper link 12 of the rear suspension device 1 of the present embodiment, and FIG. 9B is a plan view schematically illustrating the first lower link 13, second lower link 14, and third lower link 15 of the rear suspension device 1 of the present embodiment.

In the rear suspension device 1 of the present embodiment, as illustrated in the plan view of FIG. 9A, the first upper link 11 whose rigidity is relatively high, the wheel axle 32 (drive shaft in the case of a rear-wheel drive vehicle), the shock absorber 16 installed between the vehicle body 2 and the second lower link 14, the spring 17 installed between the vehicle body 2 and the second lower link 14, and the second upper link 12 whose rigidity is relatively low are arranged in this order from the front in the front-rear direction of the vehicle in a plan view of the vehicle.

By supporting the spring 17 on the second lower link 14 which is located rearward of the wheel axle 32 as in the rear suspension device 1 of this embodiment, it is possible to ensure the stroke amount of the spring 17. By locating the spring 17 rearward of the wheel axle 32, the second upper link 12 which has a large inclination angle θ2 and a relatively low rigidity can be disposed rearward of the spring 17, while the first upper link 11 which has a small inclination angle θ1 and a relatively high rigidity can be disposed in front of the wheel axle 32.

Moreover, by supporting the shock absorber 16 on the second lower link 14 which is located behind the wheel axle 32, the stroke of the shock absorber 16 relative to the stroke of the wheel 3 can be increased. As a result, the ride comfort performance can be improved. Furthermore, when the height of the upper end portion of the shock absorber 16 is set low, the volume of the luggage compartment behind the cabin can be increased for application to a station wagon or the like.

The invention claimed is:

1. A rear suspension device comprising:

two upper links and three lower links linking a wheel and a vehicle body, the two upper links including a first upper link and a second upper link, the first upper link having a rigidity that is different from a rigidity of the second upper link, wherein a shock absorber installed between the vehicle body and a front lower link of the three lower links that is at a frontmost position in a front-rear direction of the vehicle, the upper link whose rigidity is relatively high, a wheel axle, a spring installed between the vehicle body and a central lower link of the three lower links that is at a central position in the front-rear direction of the vehicle, and the upper link whose rigidity is relatively low are arranged in this order from front in a front-rear direction of the vehicle in a plan view of the vehicle.

2. The rear suspension device according to claim 1, wherein the rigidity of each of the upper links is set by using rigidity of a rubber bushing provided at an end portion of each of the upper links.

3. The rear suspension device according to claim 1, wherein the rigidity of the upper link of the two upper links that has a relatively large inclination angle with respect to a vehicle width direction in a plan view of the vehicle is lower than the rigidity of the upper link of the two upper links that has a relatively small inclination angle with respect to the vehicle width direction in the plan view of the vehicle.

4. The rear suspension device according to claim 1, wherein when inclination angles of the two upper links with respect to a vehicle width direction are equivalent, the rigidity of the upper link of the two upper links that has a relatively long distance from the wheel axle in a plan view of the vehicle is lower than the rigidity of the upper link of the two upper links that has a relatively short distance from the wheel axle in the plan view of the vehicle.

5. The rear suspension device according to claim 1, wherein an attachment position of the upper link whose rigidity is relatively high on the wheel side in a side view, a front view, or a rear view of the vehicle is higher than the attachment position of the upper link whose rigidity is relatively low on the wheel side in the side view, the front view, or the rear view of the vehicle.

6. A rear suspension device comprising:

two upper links and three lower links linking a wheel and a vehicle body, the two upper links including a first upper link and a second upper link, the first upper link having a rigidity that is different from a rigidity of the second upper link, wherein the upper link whose rigidity is relatively high, a shock absorber installed between a wheel axle and the vehicle body and a knuckle, a spring installed between the vehicle body and a central lower link of the three lower links that is at a central position in the front-rear direction of the vehicle, and the upper link whose rigidity is relatively low are arranged in this order from front in a front-rear direction of the vehicle in a plan view of the vehicle.

7. The rear suspension device according to claim 6, wherein the rigidity of each of the upper links is set by using rigidity of a rubber bushing provided at an end portion of each of the upper links.

8. The rear suspension device according to claim 6, wherein the rigidity of the upper link of the two upper links that has a relatively large inclination angle with respect to a vehicle width direction in a plan view of the vehicle is lower than the rigidity of the upper link of the two upper links that has a relatively small inclination angle with respect to the vehicle width direction in the plan view of the vehicle.

9. The rear suspension device according to claim 6, wherein when inclination angles of the two upper links with respect to a vehicle width direction are equivalent, the rigidity of the upper link of the two upper links that has a relatively long distance from the wheel axle in a plan view of the vehicle is lower than the rigidity of the upper link of the two upper links that has a relatively short distance from the wheel axle in the plan view of the vehicle.

10. The rear suspension device according to claim 6, wherein an attachment position of the upper link whose rigidity is relatively high on the wheel side in a side view, a front view, or a rear view of the vehicle is higher than the attachment position of the upper link whose rigidity is relatively low on the wheel side in the side view, the front view, or the rear view of the vehicle.

11. A rear suspension device comprising:

two upper links and three lower links linking a wheel and a vehicle body, the two upper links including a first upper link and a second upper link, the first upper link having a rigidity that is different from a rigidity of the second upper link, wherein the upper link whose rigidity is relatively high, a wheel axle, a shock absorber installed between the vehicle body and a front lower link of the three lower links that is at a frontmost position in a front-rear direction of the vehicle, a spring installed between the vehicle body and a central lower link of the three lower links that is at a central position in the front-rear direction of the vehicle, and the upper link whose rigidity is relatively low are arranged in this order from front in a front-rear direction of the vehicle in a plan view of the vehicle.

12. The rear suspension device according to claim 11, wherein the rigidity of each of the upper links is set by using rigidity of a rubber bushing provided at an end portion of each of the upper links.

13. The rear suspension device according to claim 11, wherein the rigidity of the upper link of the two upper links that has a relatively large inclination angle with respect to a vehicle width direction in a plan view of the vehicle is lower than the rigidity of the upper link of the two upper links that has a relatively small inclination angle with respect to the vehicle width direction in the plan view of the vehicle.

14. The rear suspension device according to claim 11, wherein when inclination angles of the two upper links with respect to a vehicle width direction are equivalent, the rigidity of the upper link of the two upper links that has a relatively long distance from the wheel axle in a plan view of the vehicle is lower than the rigidity of the upper link of the two upper links that has a relatively short distance from the wheel axle in the plan view of the vehicle.

15. The rear suspension device according to claim 11, wherein an attachment position of the upper link whose rigidity is relatively high on the wheel side in a side view, a front view, or a rear view of the vehicle is higher than the attachment position of the upper link whose rigidity is relatively low on the wheel side in the side view, the front view, or the rear view of the vehicle.

* * * * *